United States Patent
Yajima et al.

(10) Patent No.: US 7,453,172 B2
(45) Date of Patent: Nov. 18, 2008

(54) LINEAR SLIDE APPARATUS

(75) Inventors: Hisashi Yajima, Tsukuba-gun (JP);
Takayuki Toshida, Tsukuba-gun (JP);
Nobuhiro Fujiwara, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 120 days.

(21) Appl. No.: 10/989,332

(22) Filed: Nov. 17, 2004

(65) Prior Publication Data
US 2005/0116550 A1   Jun. 2, 2005

(30) Foreign Application Priority Data
Dec. 2, 2003   (JP)   ............................. 2003-403727

(51) Int. Cl.
*H02K 41/00* (2006.01)

(52) U.S. Cl. ...................................................... 310/12

(58) Field of Classification Search ................... 310/12, 310/13, 14
See application file for complete search history.

(56) References Cited

U.S. PATENT DOCUMENTS

| | | | | |
|---|---|---|---|---|
| 5,099,158 | A * | 3/1992 | Stuart et al. | 310/14 |
| 6,911,747 | B2 * | 6/2005 | Tsuboi et al. | 310/12 |
| 6,930,412 | B2 * | 8/2005 | Chang et al. | 310/12 |
| 2001/0015580 | A1 * | 8/2001 | Sato et al. | 310/12 |
| 2001/0015581 | A1 * | 8/2001 | Sato et al. | 310/12 |
| 2002/0047322 | A1 * | 4/2002 | Sato et al. | 310/12 |
| 2002/0163257 | A1 * | 11/2002 | Tsuboi et al. | 310/12 |
| 2005/0116550 | A1 * | 6/2005 | Yajima et al. | 310/14 |

FOREIGN PATENT DOCUMENTS

| | | | | |
|---|---|---|---|---|
| JP | 06121519 | A | * | 4/1994 |
| JP | 2000083364 | A | * | 3/2000 |
| JP | 2001352744 | A | * | 12/2001 |
| JP | 2004056892 | A | * | 2/2004 |
| JP | 2004129394 | A | * | 4/2004 |
| JP | 2004364348 | A | * | 12/2004 |
| JP | 2005039942 | A | * | 2/2005 |
| JP | 2005080317 | A | * | 3/2005 |
| JP | 2005094976 | A | * | 4/2005 |
| JP | 2005168181 | A | * | 6/2005 |
| JP | 2005245066 | A | * | 9/2005 |
| JP | 2005278280 | A | * | 10/2005 |

* cited by examiner

*Primary Examiner*—Tran Nguyen
(74) *Attorney, Agent, or Firm*—Oblon, Spivak, McClelland, Maier & Neustadt, P.C.

(57) ABSTRACT

A linear slide apparatus includes a straightly extending table guide, a table which is supported by one rail portion formed on an upper surface of the table guide and which can move in an axial direction thereof, and an electromagnetic actuator which drives the table. The electromagnetic actuator includes a first core portion, a second core portion, an exciting coil wound around the second core portion, and a moving body comprising a permanent magnet. The table guide made of magnetic material serves as the first core portion. The second core portion is fixedly mounted in the hollow hole of the table guide, and the moving body is accommodated therein movably in the axial direction.

10 Claims, 6 Drawing Sheets

LINEAR SLIDE APPARATUS

TECHNICAL FIELD

The present invention relates to a linear slide apparatus which straightly moves a table handling a workpiece by an electromagnetic actuator along a table guide.

BACKGROUND ART

As a linear slide apparatus of this kind which straightly drives a table handling a workpiece by means of an electromagnetic actuator, apparatuses having various structures are conventionally proposed. For example, according to a linear slider described in Japanese Patent Application Laid-open No. 2002-96233, a guide rail is mounted on an upper surface of a plate-like fixed stage, a moving element comprising an armature core and an armature coil is slidably supported on the guide rail through a slider, and a table is mounted on an upper surface of the moving element. Plate-like magnetic field yokes rise from both side ends of the fixed stage to surround the moving element from both sides, permanent magnets are mounted on the magnetic field yokes to form a stator, and the stator and the moving element constitute a linear motor. The moving element is moved along the guide rail by means of thrust generated when the armature coil is energized.

According to such a conventional linear slider, however, since the table is directly mounted on the upper surface of the moving element which has the armature coil, heat from the coil is directly transferred to the table, the heat is transferred to a workpiece on the table, and the temperature of the workpiece is prone to be increased. When the linear slider is used in semiconductor production equipment, it is necessary to prevent heat from being transferred to a semiconductor as much as possible.

Japanese Patent Application Laid-open No. 2001-352744 discloses a technique in which an armature assembly having an exciting coil is provided on the side of a bed instead of on the side of the table. According to this document, the above-described problem of heat transmission can be solved. However, since the table is slidably supported by two parallel guide rails, the structure is complicated, and it is troublesome to match axes of the two guide rails with an axis of an electromagnetically driving portion.

DISCLOSURE OF THE INVENTION

It is an object of the present invention to provide a linear slide apparatus in which heat from an exciting coil of an electromagnetic actuator is less prone to be transferred to a table, with a simple structure, and easy to align.

To achieve the above object, the present invention provides a linear slide apparatus comprising a straightly extending table guide, a table capable of moving along the table guide in an axial direction thereof, and an electromagnetic actuator which drives the table, wherein the table guide includes a hollow hole formed therein and a rail portion which extends outside the hollow hole in the axial direction along the table guide and which movably supports the table, the electromagnetic actuator is mounted on the table guide and includes an exciting coil which generates magnetic force when energized and a moving body which straightly moves using the magnetic force generated by the exciting coil as thrust, the moving body being disposed in the hollow hole of the table guide so as to move in the axial direction of the table guide, the moving body and the table being connected to each other through a joint member.

According to a concrete structure of the invention, the table guide includes a wide base portion having a substantially rectangular cross section and the narrow rail portion which upwardly rises from a central position of an upper surface of the base portion, a slide block is movably mounted on the rail portion, and the table is connected to the slide block.

In the invention, the electromagnetic actuator includes a core on which an exciting coil is mounted, and the exciting coil and the core are mounted on the table guide.

More specifically, the core comprises a first core portion and a second core portion which oppose to each other with a gap interposed therebetween, the moving body includes a permanent magnet and a magnet holder made of non-magnetic material for holding the permanent magnet, the permanent magnet being configured to move in the gap between both the core portions.

More specifically, the first core portion is of cylindrical shape, the second core portion is of columnar shape, the second core portion is coaxially disposed in the first core portion, the permanent magnet is of cylindrical shape, the permanent magnet is polarized with the north pole and the south pole in its radial direction, and the permanent magnet is disposed in the hollow hole of the table guide coaxially with both the core portions.

In the invention, preferably, the table guide is made of magnetic material, also functioning as the first core.

According to another structure of the invention, the linear slide apparatus further comprises two sets of exciting coils and cores and one moving body, the two sets of exciting coils and the core portions opposing each other, and the moving body is disposed between these core portions.

In the invention, the linear slide apparatus can further comprise a displacement sensor for detecting displacement of moving portions including the moving body and the table.

According to the present invention having the above-described structure, the table is movably supported by the single rail portion formed on an outer surface of the table guide, the electromagnetic actuator is mounted on the table guide, and the moving body of the electromagnetic actuator and the table are connected to each other through the joint member. Therefore, heat from the exciting coil of the electromagnetic actuator is not directly transferred to the table. Further, as compared with a case in which a plurality of rail portions are provided, the structure is simple and the alignment is easy.

DETAILED DESCRIPTION OF THE INVENTION

Figure 1:
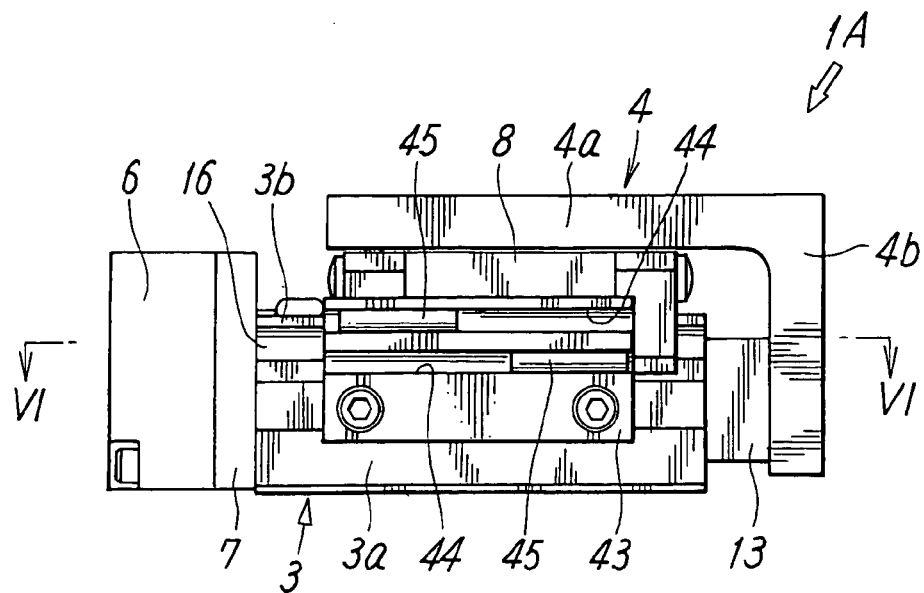
FIG. 1 is a side view showing a first embodiment of a linear slide apparatus according to the present invention.

FIGS. 1 to 6 show a first embodiment of a linear slide apparatus according to the present invention. The linear slide apparatus 1A includes a straightly extending table guide 3, a table 4 movable along the table guide 3 in its axial direction, an electromagnetic actuator 5 which drives the table 4, and a driver 6 which controls the electromagnetic actuator 5.

The table guide 3 has a reversed T-shaped cross section as a whole, integrally provided with a wide base portion 3a having a substantially rectangular cross section, and a narrow rail portion 3b which upwardly rises from a central position of an upper surface of the base portion 3a. A circular hollow hole 10 is formed in the table guide 3 so as to extend in an axial direction of the table guide 3. A plurality of mounting holes 11 is vertically formed at four corners of the base portion 3a. The table guide 3 can be fixed to a pedestal or the like by means of bolts which are inserted through the mounting holes 11. An end block 7 is mounted on the base end of the table guide 3 so as to close the hollow hole 10. The driver 6 is mounted on an outer surface of the end block 7, and a tip end of the table guide 3 is open.

The table 4 comprises a horizontal first portion 4a and a second portion 4b extending downwardly at right angles from a tip end of the first portion 4a, and has a substantially L-shape as a whole. The first portion 4a is movably supported by a rail portion 3b of the table guide 3 through the slide block 8. The first portion 4a is for placing a work to be conveyed on an upper surface thereof, and has substantially the same lateral width as that of the table guide 3. The second portion 4b is used for pressing the workpiece, a lower end thereof extending to a portion of the table guide 3 near its bottom, and is connected to a moving body 30 of the electromagnetic actuator 5 by means of a bolt 14 through a joint member 13. The joint member 13 extends from the moving body 30 toward an outer side of the hollow hole 10 in the axial direction, and is integrally provided with a later-described magnet holder 39. The joint member 13 may be formed separately from the magnet holder 39 and they may be connected to each other.

Figure 4:
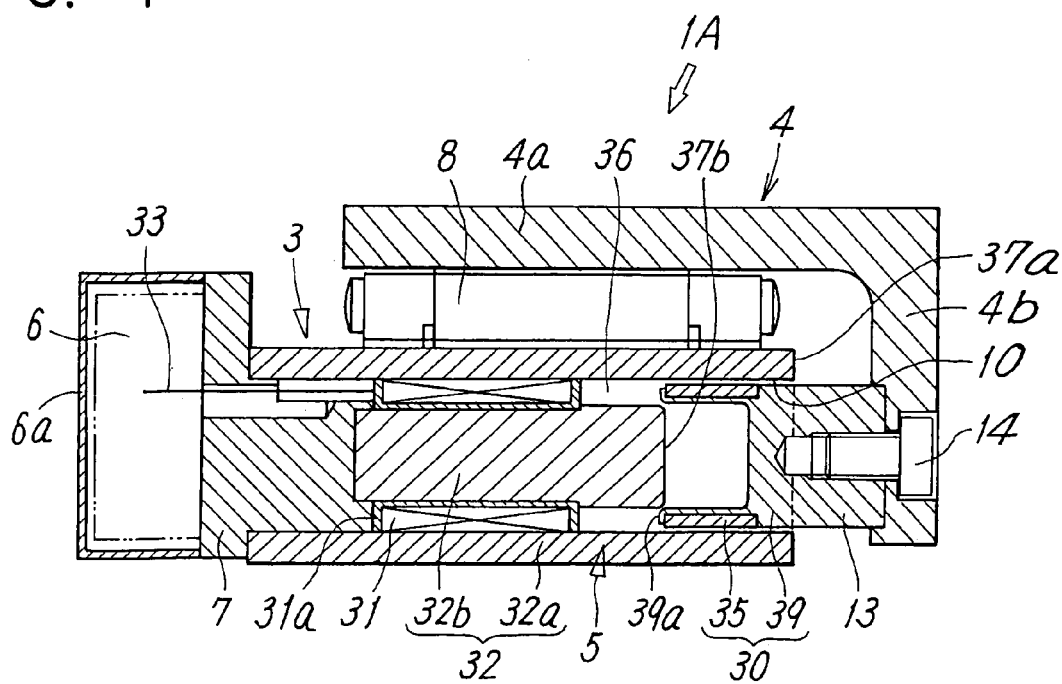
FIG. 4 is an enlarged sectional view taken along the line IV-IV in FIG. 3.
Figure 5:
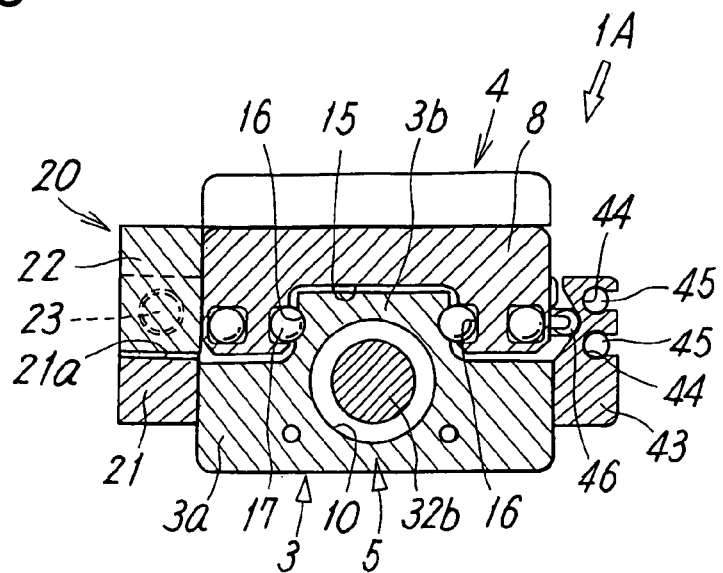
FIG. 5 is an enlarged sectional view taken along the line V-V in FIG. 2.
Figure 6:
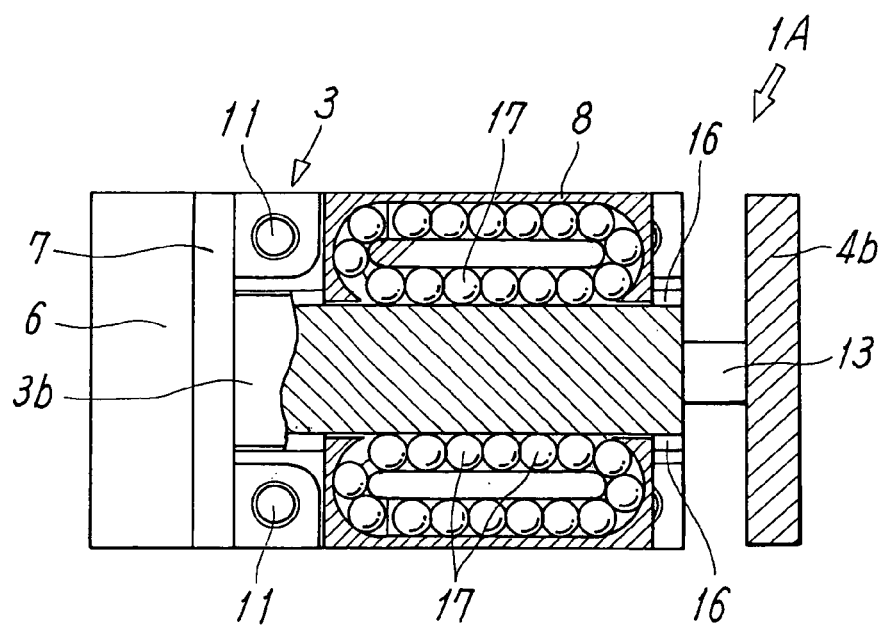
FIG. 6 is a partial sectional view taken along the line VI-VI in FIG. 1.

The slide block 8 has substantially the same lateral width as that of the table guide 3, and has a shorter axial length than that of the table guide 3. The slide block 8 is provided at its central portion of a lower surface with a groove 15 into which the rail portion 3b of the table guide 3 is fitted. The slide block 8 is movably supported by the rail portion 3b in the following manner. That is, as shown in FIGS. 4 and 5, left and right side surfaces of the rail portion 3b and left and right groove walls of the groove of the slide block 8 are provided with V-shaped or U-shaped guide grooves 16 at locations opposed to each other in the axial direction of the table guide 3. A plurality of rolling elements 17 is interposed between the guide grooves 16, 16, and the slide block 8 is movably supported by the rail portion 3b through the rolling elements 17. The rolling element 17 is made of iron or stainless steel ball, but may be a resin ball made of hard synthetic resin. Such ball-like rolling elements 17 are arranged in a form of an endless elliptic shape, and roll circulatingly in rolling contact with the slide block 8 and the rail portion 3b as the slide block 8 moves. When resin balls are used as the rolling elements 17, the resin balls may be used alone, but it is preferable to mix the resin balls and steel balls so as to be disposed alternately.

It is unnecessary that the rolling elements 17 are disposed in the endless form and roll, but may come into rolling contact with the slide block 8 and the rail portion 3b. The shape of the rolling element 17 is not limited to the ball, and it may be of columnar shape or other shape. The supporting mechanism which supports the slide block 8 on the rail portion 3b may use a wheel or a sliding bearing, or may employ an air floating system or a magnetic floating system.

Figure 2:
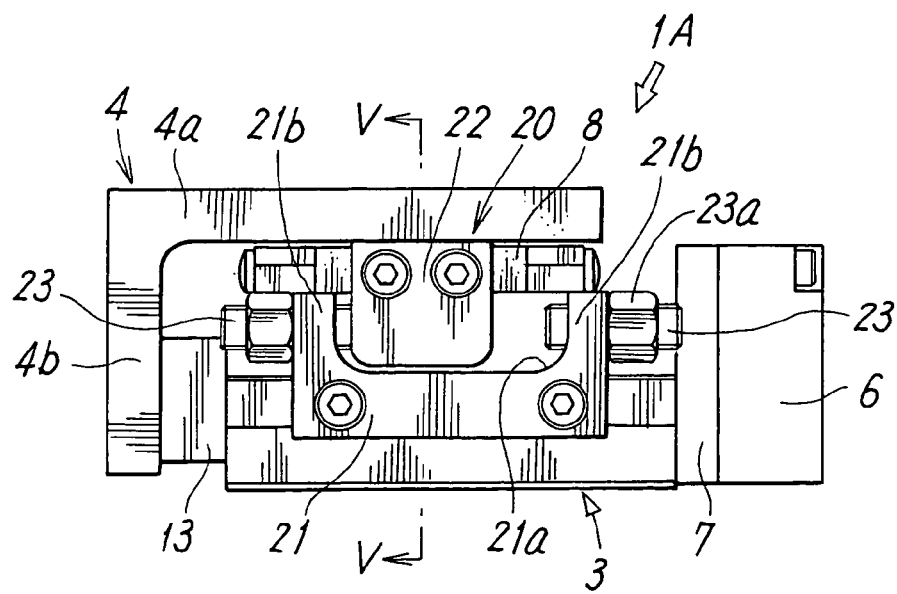
FIG. 2 is a side view of the linear slide apparatus on the opposite side from FIG. 1.
Figure 3:
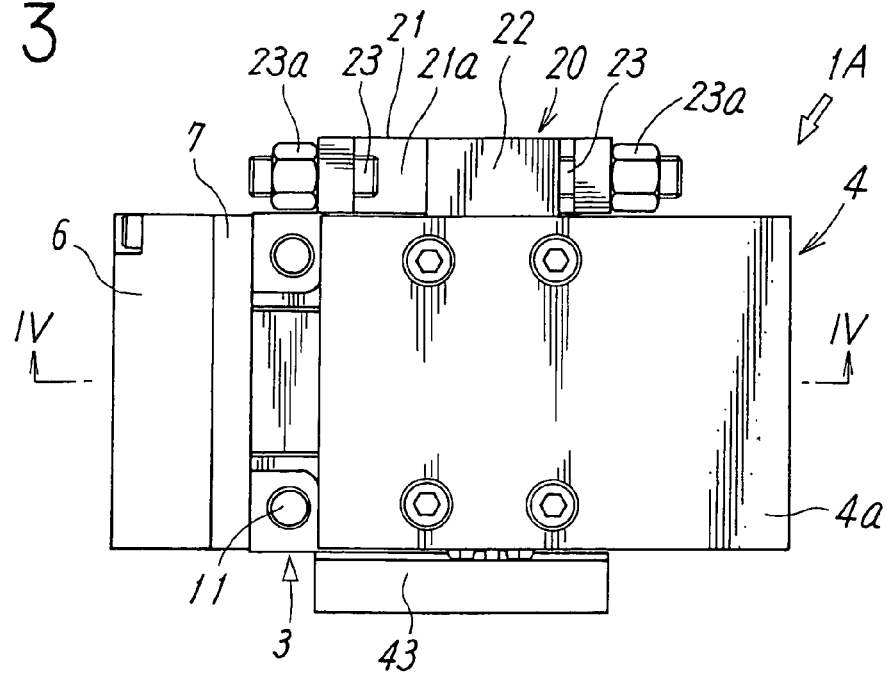
FIG. 3 is a plan view of FIG. 1.

The moving range of the slide block 8 is limited by a damper mechanism 20. As shown in FIGS. 2 and 5, the damper mechanism 20 includes a U-shaped damper base 21 fixed to one of side surfaces of the table guide 3, and an abutment element 22 which is fixed to a side surface of the slide block 8 and which is fitted into a recess 21a of the damper base 21. Threaded rod-like stoppers 23, 23 are mounted on both left and right sidewalls 21b, 21b of the recess 21a of the damper base 21 by nuts 23a with tip ends thereof projecting into the recess 21a, so that forward and backward movements thereof can be adjusted in a direction parallel to the axial direction of the table guide 3. When the slide block 8 moves, the abutment element 22 abuts against the stoppers 23, 23 so that the stroke end positions of the slide block 8 are limited.

As is apparent from FIG. 4, the electromagnetic actuator 5 straightly moves the moving body 30 using, as thrust, a magnetic force generated when the exciting coil 31 is energized. In this embodiment, the electromagnetic actuator 5 is a magnetically movable actuator, and is mounted on the table guide 3. More specifically, the electromagnetic actuator 5 includes the exciting coil 31, a core 32 made of magnetic material on which the exciting coil 31 is mounted, and the moving body 30. The exciting coil 31, the core 32 and the moving body 30 are mounted on the table guide 3, and the exciting coil 31 and the driver 6 are electrically connected to each other through a lead wire 33 which penetrates the end block 7. The driver 6 comprises a printed board on which a circuit is printed, whereon necessary electric parts are mounted. The driver 6 is mounted on an outer surface of the end block 7, and is covered with a detachable cover 6a.

The core 32 comprises a substantially cylindrical outer first core portion 32a and a columnar inner second core portion 32b. The first core portion 32a also serves as the table guide 3 made of magnetic material, and the second core portion 32b is coaxially disposed in the first core portion 32a, i.e., in the hollow hole 10. The exciting coil 31 is wound around an outer periphery of the second core portion 32b at a location closer to the base end. A gap 36 is formed between the outer peripheral surface of the second core portion 32b closer to tip end thereof and an inner peripheral surface of the first core portion 32a, in which a permanent magnet 35 of the moving body 30 moves. The second core portion 32b is shorter than the first core portion 32a. A tip end 37b of the second core portion 32b is disposed rearward of a tip end 37a of the first core portion 32a closer to an inner side in the axial direction, and the opposite side base end is held by the end block 7. The end block 7 is made of magnetic material, and comes into contact with the first core portion 32a, thereby constituting a magnetic circuit together with the first core portion 32a and the second core portion 32b.

Although the first core portion 32a also serves as the table guide 3 in the illustrated embodiment, the first core portion 32a may be formed as a cylindrical member separate and independent from the table guide 3, and may be mounted in the hollow hole 10 of the table guide 3. In this case, it is unnecessary that the table guide 3 is made of magnetic material. Also in case when the first core portion 32*a* and the table guide 3 are formed as separate members, a diameter of the hollow hole 10 of the table guide 3 is increased only by a thickness of the first core portion 32*a*, and the linear slide apparatus can still be reduced in size, but in order to further reduce the linear slide apparatus in size while more simplifying its structure, it is preferable that the table guide 3 also serve as the first core portion 32*a*.

When the first core portion 32*a* is formed separately from the table guide 3, the first core portion 32*a* may not be formed as the same length as the table guide 3 but shorter, and its tip end 37*a* may be disposed substantially at the same position as the tip end 37*b* of the second core portion 32*b*.

The moving body 30 comprises the cylindrical permanent magnet 35 which the north pole and the south pole thereof are polarized in radial direction, and a columnar magnet holder 39 made of non-magnetic material such as aluminum for holding the permanent magnet 35. The permanent magnet 35 is fitted on an outer periphery of a cylindrical portion 39*a* formed on the tip end of the magnet holder 39. The moving body 30 is disposed such that the permanent magnet 35 is coaxially located with respect to the core portions 32*a* and 32*b* at location closer to a tip end in the first core portion 32*a*, and is configured to move in the axial direction of the core portion. An outer diameter of the permanent magnet 35 is formed slightly smaller than an inner diameter of the first core portion 32*a*, and an inner diameter of the permanent magnet 35 and an inner diameter of the cylindrical portion 39*a* of the magnet holder 39 are slightly greater than an outer diameter of the second core portion 32*b*. Therefore, the permanent magnet 35 can move in the gap 36 between both the core portions 32*a*, 32*b*. The joint member 13 is formed on the base end of the magnet holder 39.

In the electromagnetic actuator 5, if current is allowed to flow through the exciting coil 31, the first core portion 32*a* and the second core portion 32*b* are magnetized with opposite poles of the north and south poles, and the polarities are changed depending upon the direction of current. For example, when the inner peripheral side of the permanent magnet 35 is polarized with the south pole and the outer peripheral side thereof is polarized with the north pole, if the exciting coil 31 is energized in a state in which the moving body 30 occupies a first position in FIG. 4, the first core portion 32*a* assumes the south pole and the second core portion 32*b* assumes the north pole, the permanent magnet 35 is attracted toward the second core portion 32*b* by the magnetic attraction force, and moves leftward in the drawing, and the permanent magnet 35 switches to a second position in the gap 36 between both the core portions 32*a*, 32*b*. If the permanent magnet 35, i.e., the moving body 30 moves, the table 4 and the slide block 8 also moves to the second position along the rail portion 3*b*, and a workpiece placed on the table 4 is conveyed.

If the direction of current flowing through the exciting coil 31 is reversed, the first core portion 32*a* assumes the north pole and the second core portion 32*b* assumes the south pole. Therefore, the moving body 30 moves rightward in the drawing by the magnetic repulsion force acting between both the core portions 32*a*, 32*b* and the permanent magnet 35, and moves to the first position. With this, the table 4 and the slide block 8 also move to the same first position.

When the exciting coil 31 is not energized, the moving body 30 is attracted toward the second core portion 32*b* by the action of the magnetic force caused by the permanent magnet 35 to basically occupy the second position, but by biasing the moving body 30 or the slide block 8 by means of spring means such as a coil spring, the moving body 30 and the slide block 8 can occupy either the first position or the second position at the time of non-energization.

The exciting coil 31 generates heat by energization. This heat is dispersed and radiated through the table guide 3 and the end block 7, and is not directly transferred to the table 4. Thus, the inconvenience that a workpiece on the table 4 is heated can be avoided. More particularly, since the slide block 8 to which the table 4 is fixed is supported by the rail portion 3*b* having small cross sectional area formed on the outer surface of the table guide 3, and a contact area with respect to the slide block 8 and the rail portion 3*b*, i.e., the table guide 3 is extremely small, heat from the table guide 3 is less prone to be transferred to the slide block 8 and the table 4.

To enhance the heat radiation performance, it is preferable that the exciting coil 31 is coated with synthetic resin, this coating resin and the first core portion 32*a* being adhered to each other using adhesive having excellent heat transfer performance. Thus, heat from the exciting coil 31 is directly transferred to the first core portion 32*a* through the adhesive from the coating layer, the heat being radiated toward outside air or the pedestal. Therefore, the heat radiation efficiency is further enhanced and the heat radiation time is shortened. When other mutually bonded members, e.g., a bobbin 31*a* around which the exciting coil 31 is wound and the second core portion 32*b* are adhered to each other using adhesive, if the adhesive having excellent heat transfer performance as described above is used, the heat radiation performance is further enhanced.

Further, the single rail portion 3*b* is formed on the central position of the upper surface of the table guide 3 and the table 4 is supported by the rail portion 3*b* through the slide block 8. Therefore, its structure is simple as compared with a case in which the table 4 slides along two rails, and the alignment operation between the rail portion 3*b* and the electromagnetic actuator 5 is easy.

The linear slide apparatus 1A is provided with a position detecting mechanism which detects the operating position of a moving portion driven by the electromagnetic actuator 5, i.e., the moving portion such as the moving body 30, the slide block 8 or the table 4. In the illustrated embodiment, the position detecting mechanism is constructed so as to detect the displacement of the slide block 8 using a displacement sensor. That is, a sensor rail 43 is mounted on a side surface opposite from the side surface on which the damper mechanism 20 of the table guide 3 is mounted such that at least a portion of a side surface of the slide block 8 is covered with the sensor rail 43. The sensor rail 43 is provided with two mounting grooves 44, in which magnetic sensitive type displacement sensors 45 are each mounted at different positions in axial directions. On the other hand, one detectable magnet 46 is mounted on the side surface of the slide block 8 at a position corresponding to the displacement sensors 45 by means of an appropriate magnet holder. Variation of magnetic flux density caused by displacement of the detectable magnet 46 is detected by each of the displacement sensors 45 so that positions of both stroke ends or any position of the stroke of the slide block 8 are detected. Signals from the displacement sensors 45 are fed back to the driver 6 and can be utilized for controlling the electromagnetic actuator 5.

However, the construction of the position detecting mechanism is not limited to such a detecting system. For example, like a linear slide apparatus 1B of a second embodiment shown in FIG. 7, the position detecting mechanism may be a scale-counting type of counting encoder scale 47 by means of a reader head 48. In this case, as shown in the drawing, the encoder scale 47 may be mounted on the slide block 8 and the reader head 48 may be mounted on the table guide 3, or the encoder scale 47 may be mounted on the table guide 3 and the reader head 48 may be mounted on the slide block 8.

Figure 7:
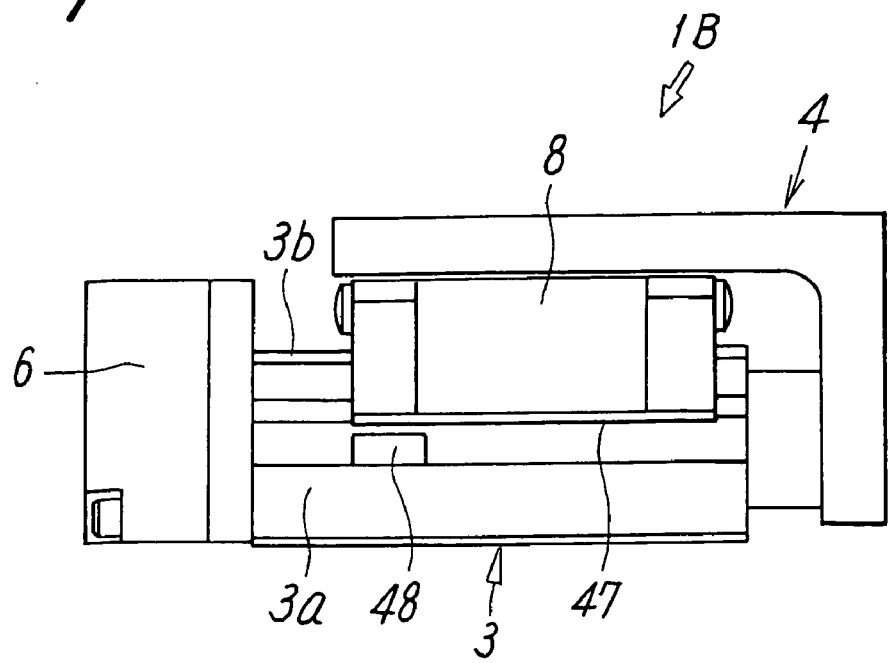
FIG. 7 is a side view showing a second embodiment of the invention.
Figure 8:
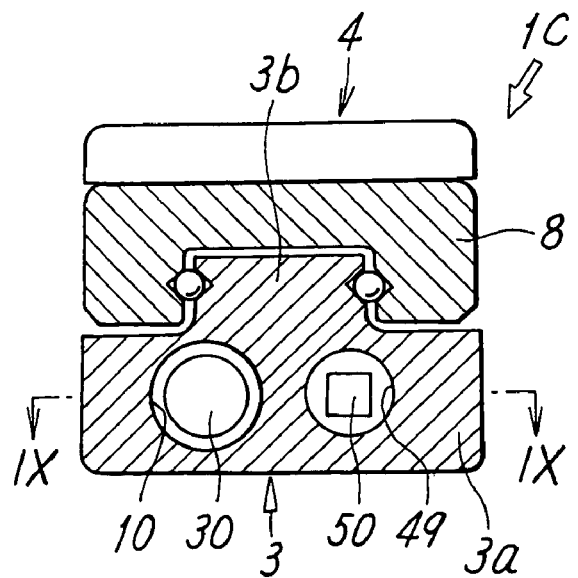
FIG. 8 is a vertical sectional view showing a third embodiment of the invention.
Figure 9:
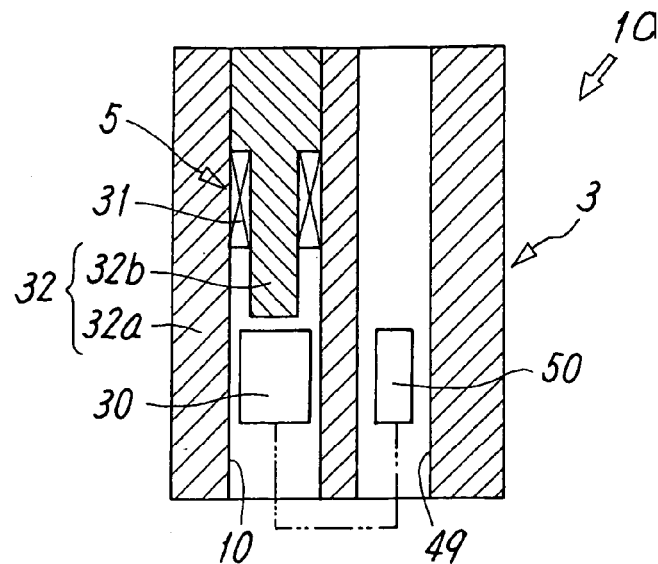
FIG. 9 is a sectional view taken along the line IX-IX in FIG. 8.

When the encoder scale 47 and the reader head 48 are disposed, the mounting positions thereof are not limited to the side end upper surface of the base portion 3a of the table guide 3 and the side end lower surface of the slide block 8 as shown in FIG. 7, but they may be mounted on an upper surface of the rail portion 3b of the table guide 3 and a lower surface of a portion of the slide block 8 which covers the rail, or may be mounted in the hollow hole of the table guide 3 and the moving body. Further, as in a linear slide apparatus 1C of a third embodiment shown in FIGS. 8 and 9, the table guide 3 may be provided with a detection hole 49 in parallel to the hollow hole 10 in which the moving body 30 is accommodated, a detection moving member 50 may be accommodated therein to move in synchronization with the moving body 30, with the encoder scale 47 and the reader head 48 being disposed on the moving member 50 and the detection hole 49.

Figure 10:
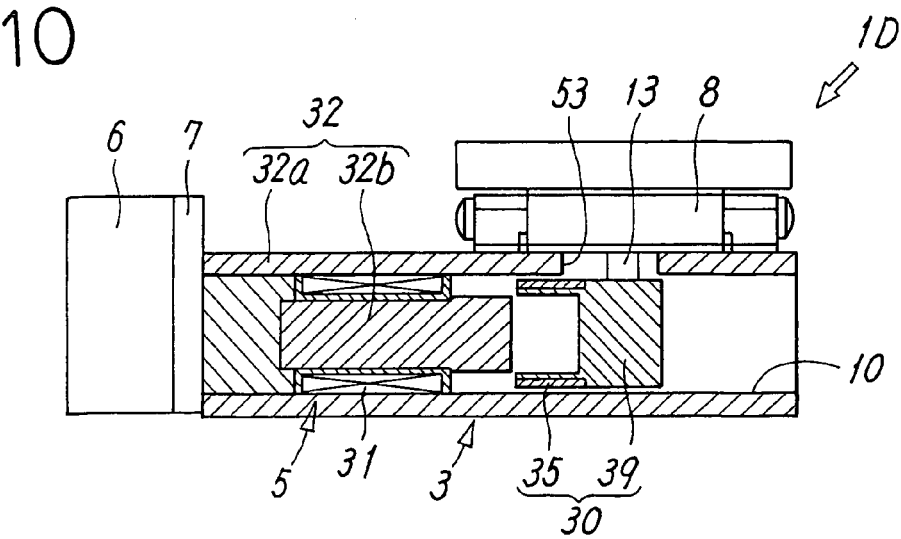
FIG. 10 is a vertical sectional view showing a fourth embodiment of the invention.

FIG. 10 shows a fourth embodiment of the invention. A linear slide apparatus 1D of the fourth embodiment is different from the linear slide apparatus 1A of the first embodiment in that the moving body 30 and the table 4 of the first embodiment are connected to each other through the joint member 13 which extends in the axial direction of the hollow hole 10 of the table guide 3, but the moving body 30 and the table 4 of the fourth embodiment are connected with each other through a joint member 13 that extends at right angle to the axial direction of the hollow hole 10 and crosses a portion of the table guide 3.

That is, a notch 53 that ranges with the hollow hole 10 is formed in a portion of an upper surface of the table guide 3 where the slide block 8 is disposed. The magnet holder 39 of the moving body 30 and the slide block 8 are connected to each other through the notch 53 via the straight rod-like joint member 13 which rises at right angles to the axial direction of the table guide 3. With this structure, the axial length of the linear slide apparatus can be shortened as compared with the first embodiment.

The other structure of the fourth embodiment and preferred modifications thereof are substantially the same as those of the first embodiment. Thus, the same essential constituent elements are designated with the same symbols as those of the first embodiment, and explanation thereof is omitted.

Figure 11:
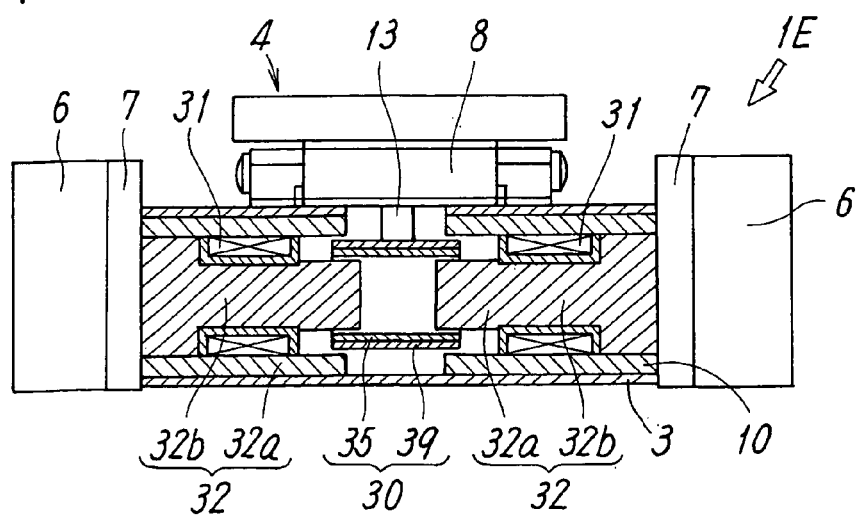
FIG. 11 is a vertical sectional view showing a fifth embodiment of the invention.

FIG. 11 shows a principle of a fifth embodiment of the present invention. A linear slide apparatus 1E of the fifth embodiment is different from those of the previous embodiments in having two sets of cores 32, 32 and one moving body 30. Like the previous embodiments, the core 32 comprises a cylindrical first core portion 32a, and a columnar second core portion 32b which is coaxially provided in the first core portion 32a. The exciting coil 31 is wound around an outer periphery of the base end of the second core portion 32b. The moving body 30 has a cylindrical permanent magnet 35 polarized in the radial direction which is held by a cylindrical magnet holder 39. The two sets of cores 32, 32 are accommodated in the hollow hole 10 of the table guide 3 so as to oppose each other at a distance therebetween. The moving body 30 is disposed therebetween, and the moving body 30 and the slide block 8 supported by the table guide 3 are connected to each other through the joint member 13.

The table guide 3 is provided at opposite ends thereof with drivers 6 for energizing the exciting coils 31 of the two sets of cores 32, 32, but the drivers 6 may be brought together in one.

The other structure of the fifth embodiment and preferred modifications thereof are substantially the same as those of the fourth embodiment.

In each of the above embodiments, the hollow hole 10 of the table guide 3 is of circular shape and correspondingly, the first core portion 32a, the second core portion 32b of the electromagnetic actuator 5 and the moving body 30 are of cylindrical or columnar shape, but they may be formed into rectangular shape, U-shape, or angular shape. When the table guide 3 and the first core portion 32a are separately formed, the hollow hole 10 may be formed into a circular shape, the first core portion 32a, the second core portion 32b and the moving body 30 may be formed into angular shape, or the hollow hole 10 may be formed into angular shape and the first core portion 32a, the second core portion 32b and the moving body 30 may be formed into circular shape. The hollow hole 10 need not be completely closed over its entire length, but may be partially formed with the notch 53 as shown in the fourth embodiment, or a side surface thereof may be opened by forming a slit.

Figure 12:
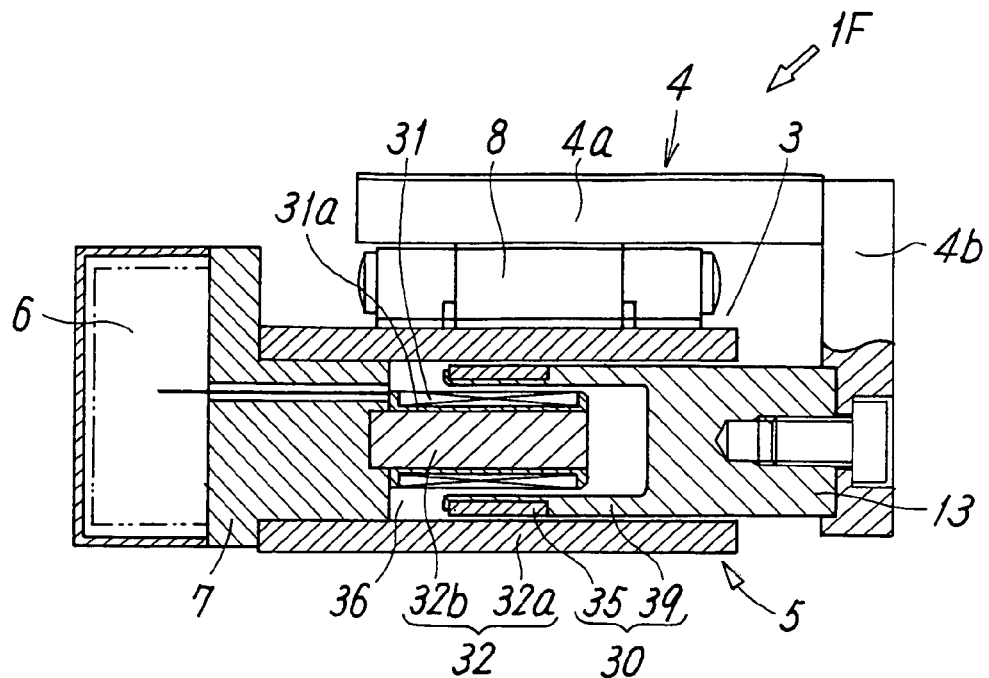
FIG. 12 is a vertical sectional view showing a sixth embodiment of the invention.

FIG. 12 shows a principle of a sixth embodiment of the present invention. A linear slide apparatus 1F of the sixth embodiment has a voice coil type electromagnetic actuator 5. In the electromagnetic actuator 5, the exciting coil 31 wound around a bobbin 31a is mounted on an outer periphery of the second core portion 32b substantially over its entire length. The permanent magnet 35 of the moving body 30 is movably fitted in the gap 36 formed between an outer periphery of the exciting coil 31 and an inner periphery of the first core portion 32a.

The other structure of the sixth embodiment and preferred modifications thereof are substantially the same as those of the first embodiment. Thus, the same essential constituent elements are designated with the same symbols as those of the first embodiment, and explanation thereof is omitted.

In the sixth embodiment, the exciting coil 31 is mounted on the outer periphery of the second core portion 32b, and the permanent magnet 35 is disposed on the outer periphery of the exciting coil 31. Alternatively, the exciting coil 31 may be mounted on an inner peripheral surface of the first core portion 32a, and the permanent magnet 35 may be disposed between the inner side of the exciting coil 31, i.e., the inner periphery of the exciting coil 31 and the outer periphery of the second core portion 32b. Instead of providing the exciting coil 31 on the side of the core 32 and the permanent magnet 35 on the side of the moving body 30 as in above examples, the permanent magnet 35 may be provided on the side of the core 32, i.e., on the inner periphery of the first core portion 32a or the outer periphery of the second core portion 32b, and the exciting coil 31 may be provided on the side of the moving body 30. With this structure, exciting coil 31 can be moved by magnetic force.

Figure 13:
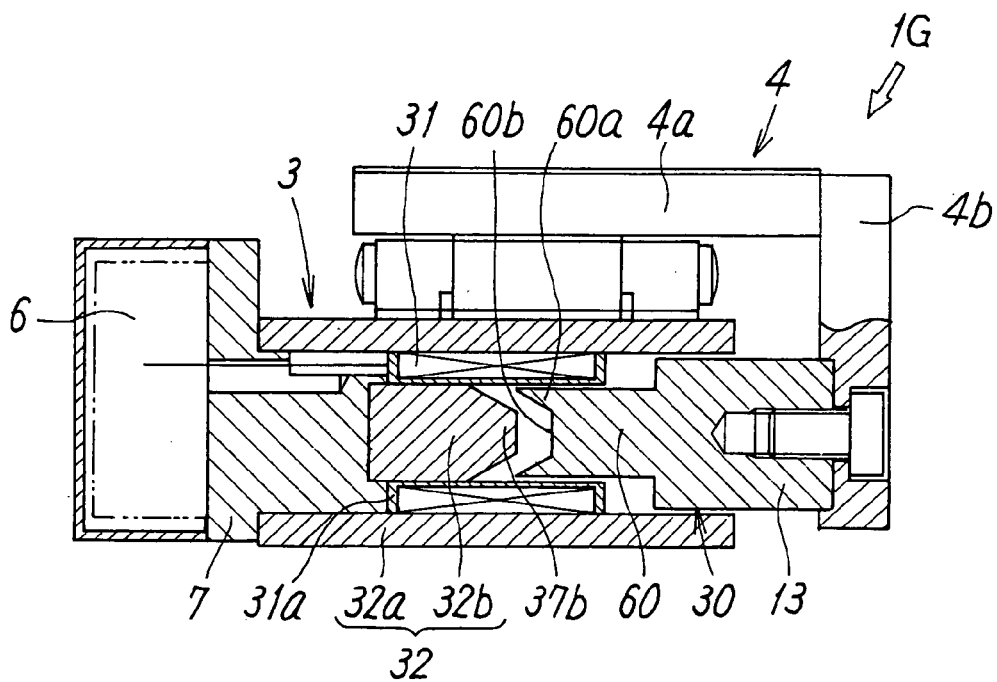
FIG. 13 is a vertical sectional view showing a seventh embodiment of the invention.

FIG. 13 shows a principle of a seventh embodiment of the present invention. A linear slide apparatus 1G of the seventh embodiment has a solenoid type electromagnetic actuator 5 whose iron core is moved by a magnetic force. That is, in the electromagnetic actuator 5, the moving body 30 includes a movable iron core portion 60 made of magnetic material, the movable iron core portion 60 is disposed in a hollow portion of the first core portion 32a so as to oppose the second core portion 32b, and extends to an inner side of the exciting coil 31. A tip end 37b of the second core portion 32b is formed into a reversed T-shape by tapering the tip end 37b. A tip end 60a of the movable iron core portion 60 which corresponds to the tip end 37b is formed into a U-shape by the recess 60b which is reversely tapered. If the exciting coil 31 is energized, the movable iron core portion 60 is adsorbed by the second core portion 32b.

The other structure of the seventh embodiment and preferred modifications thereof are substantially the same as those of the first embodiment. Thus, the same essential constituent elements are designated with the same symbols as those of the first embodiment, and explanation thereof is omitted.

The invention claimed is:

1. A linear slide apparatus comprising a straightly extending table guide, a table capable of moving along the table guide in an axial direction thereof, and an electromagnetic actuator which drives the table, wherein
the table guide includes a hollow hole formed therein, and a rail portion which is integrally formed with the table guide outside the hollow hole and extends in the axial direction along the table guide and which movably supports the table,
the electromagnetic actuator includes an exciting coil generating a magnetic force when energized and a second core portion which are fixedly and co-centrally mounted in the hollow hole of the table guide, a first core portion of which encloses said exciting coil and said second core portion, a moving body which moves straightly using the magnetic force generated in both the first and second core portions as thrust when a current is passed through the exciting coil, the moving body including a permanent magnet and being disposed in the hollow hole of the table guide so as to move in the axial direction of the table guide, and the moving body and the table being interconnected through a joint member, and
the table guide is made of magnetic material and serves as the first core portion.

2. The linear slide apparatus according to claim 1, wherein the table guide includes a wide base portion having a substantially rectangular cross section and a narrow rail portion which rises upwardly from a central position of an upper surface of the base portion, a slide block is movably mounted on the rail portion in a condition that the slide block lies across the rail portion, and wherein the table is connected to the slide block.

3. The linear slide apparatus according to claim 1, wherein the moving body includes the permanent magnet and a magnet holder made of non-magnetic material for holding the permanent magnet, the permanent magnet configured to move in the gap between both the core portions.

4. The linear slide apparatus according to claim 2, wherein the moving body includes the permanent magnet and a magnet holder made of non-magnetic material for holding the permanent magnet, the permanent magnet configured to move in the gap between both the core portions.

5. The linear slide apparatus according to claim 3, wherein the first core portion is of cylindrical shape, the second core portion is of columnar shape, the second core portion being coaxially disposed in the first core portion, the permanent magnet is of cylindrical shape and is polarized with the north pole and the south pole in its radial direction, and is disposed in the hollow hole of the table guide coaxially with both the core portions.

6. The linear slide apparatus according to claim 4, wherein the first core portion is of cylindrical shape, the second core portion is of columnar shape, the second core portion being coaxially disposed in the first core portion, the permanent magnet is of a cylindrical shape being polarized with the north pole and the south pole in its radial direction, and is disposed in the hollow hole of the table guide coaxially with both the core portions.

7. The linear slide apparatus according to claim 1, further comprising two sets of exciting coils and portions and one moving body, wherein the two sets of exciting coils and the portions are disposed opposite each other, and the moving body is disposed between said first and second portions.

8. The linear slide apparatus according to claim 1, further comprising two sets of exciting coils, two core portions and one moving body, wherein the two sets of exciting coils and the two core portions are disposed opposite each other, and the moving body is disposed between said two core portions.

9. The linear slide apparatus according to claim 1, further comprising a displacement sensor for detecting displacement of moving portions including the moving body and the table.

10. The linear slide apparatus according to claim 2, further comprising a displacement sensor for detecting displacement of moving portions including the moving body and the table.

* * * * *